US012083062B2

(12) United States Patent
Rideout

(10) Patent No.: US 12,083,062 B2
(45) Date of Patent: Sep. 10, 2024

(54) ATHLETIC PLAYER SEATING SYSTEM

(71) Applicant: Chris Rideout, Midlothian, TX (US)

(72) Inventor: Chris Rideout, Midlothian, TX (US)

( * ) Notice: Subject to any disclaimer, the term of this patent is extended or adjusted under 35 U.S.C. 154(b) by 143 days.

(21) Appl. No.: 17/395,497

(22) Filed: Aug. 6, 2021

(65) Prior Publication Data

US 2023/0041697 A1 Feb. 9, 2023

(51) Int. Cl.

| | |
|---|---|
| ***A61H 1/00*** | (2006.01) |
| ***A47C 7/62*** | (2006.01) |
| ***A47C 7/74*** | (2006.01) |

(52) U.S. Cl.

CPC ............. *A61H 1/005* (2013.01); *A47C 7/624* (2018.08); *A47C 7/744* (2013.01); *A47C 7/748* (2013.01); *A61H 2201/0149* (2013.01); *A61H 2201/0207* (2013.01); *A61H 2201/0214* (2013.01); *A61H 2201/025* (2013.01); *A61H 2201/107* (2013.01); *A61H 2201/1626* (2013.01); *A61H 2201/1642* (2013.01); *A61H 2201/5023* (2013.01); *A61H 2203/0431* (2013.01)

(58) Field of Classification Search

CPC .. A61H 1/00; A61H 1/005; A61H 2201/0149; A61H 2201/0207; A61H 2201/0214; A61H 2201/025; A61H 2201/107; A61H 2201/1626; A61H 2201/1642; A61H 2201/5023; A61H 2203/0431; A47C 7/624; A47C 7/744; A47C 7/748; F04D 19/002; F04D 29/522; F04D 29/541; F04D 29/545; F04D 29/547; F04D 29/601; F04D 29/644; F04D 29/646

See application file for complete search history.

(56) References Cited

U.S. PATENT DOCUMENTS 2,584,646 A * 2/1952 Wagstaff ................ B60N 3/103 224/570

4,463,859 A * 8/1984 Greene ................. A61J 9/0661 215/11.1

(Continued)

FOREIGN PATENT DOCUMENTS

KR 200360288 Y1 * 8/2004

OTHER PUBLICATIONS

Pilki Moon, "17395497_Apr. 20, 2023_KR_200360288_Y1_M.pdf", Aug. 25, 2004, English translation of KR 200360288 Y1 (Year: 2004).*

*Primary Examiner* — Justine R Yu

*Assistant Examiner* — Alexander Morales

(74) *Attorney, Agent, or Firm* — Jacob M. Ward; Ward Law Office LLC

(57) ABSTRACT

An athletic player seating system; the athletic player seating system may include a seating unit having a first-seat, a center console, and a second-seat hosted on a frame. The first-seat and the second-seat each include a backrest, a seat portion, and a footrest having padded sections hosting heating elements and massagers positioned on all user-contacting surface points. The first-seat and the second-seat each further include a cooling system and a series of air vents positioned to direct air moved by the cooling system towards the first-seat and the second-seat. The seating unit also includes a first-liquid-container and a second-liquid-container for water and sports beverages. Additionally, the seating unit includes means for oxygen delivery to a user.

1 Claim, 9 Drawing Sheets

(56) References Cited

U.S. PATENT DOCUMENTS

| | | | | | |
|---|---|---|---|---|---|
| 4,621,633 | A * | 11/1986 | Bowles | A61M 16/1095 | 128/203.27 |
| 5,484,405 | A * | 1/1996 | Edstrom, Sr. | A61J 15/0011 | 604/79 |
| 5,868,687 | A * | 2/1999 | Tedesco | A61H 1/00 | 601/56 |
| 5,934,751 | A * | 8/1999 | Johnson | A47C 1/16 | 297/252 |
| 6,039,702 | A * | 3/2000 | Cutler | A61H 23/0263 | 601/57 |
| 6,082,583 | A * | 7/2000 | Bussell | A61J 9/00 | 224/407 |
| 6,745,594 | B2 * | 6/2004 | Kreutzman | A45F 3/20 | 62/457.2 |
| 6,776,453 | B1 * | 8/2004 | Floyd, Jr. | A47C 7/744 | 297/180.12 |
| 8,123,290 | B1 * | 2/2012 | Aiken | A47C 31/11 | 297/229 |
| 8,864,221 | B1 * | 10/2014 | Delvilla | A47C 7/5066 | 297/180.12 |
| 9,155,398 | B2 * | 10/2015 | Arens | A47C 7/744 | |
| 9,943,174 | B1 * | 4/2018 | Jacobs | A61H 9/0078 | |
| 10,306,989 | B2 * | 6/2019 | Tehrani | A47C 7/021 | |
| 10,694,857 | B2 * | 6/2020 | Andon | A47C 7/748 | |
| 2015/0336445 | A1 * | 11/2015 | Uehara | B60H 1/3421 | 454/155 |
| 2016/0096626 | A1 * | 4/2016 | Hoch | B64D 11/064 | 244/118.6 |
| 2017/0202357 | A1 * | 7/2017 | Holzner | A47C 7/68 | |
| 2017/0252260 | A1 * | 9/2017 | Gummin | A61H 11/00 | |
| 2019/0351735 | A1 * | 11/2019 | Kawano | A47C 7/74 | |
| 2019/0359106 | A1 * | 11/2019 | Suzuki | B60N 2/5628 | |
| 2021/0146078 | A1 * | 5/2021 | Huang | A61M 16/01 | |

* cited by examiner

ATHLETIC PLAYER SEATING SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of seats and chairs of existing art and more specifically relates to athletic seating.

RELATED ART

Today, many professional athletes sit on uncomfortable metal benches or metal folding chairs while on the sidelines before and during a game. These traditional benches and folding chairs do not help prepare athletes for their next play and could actually be depleting their strength, flexibility and stamina. Additionally, sporting events such as football, soccer, baseball, etc., occurring outdoors are subject to weather conditions of extreme high or low temperatures. The athletes in these events, particularly when standing or sitting on the sidelines during a game, can become overheated or badly chilled. A suitable solution is desired.

SUMMARY OF THE INVENTION

In view of the foregoing disadvantages inherent in the known athletic seating art, the present disclosure provides a novel athletic player seating system. The general purpose of the present disclosure, which will be described subsequently in greater detail, is to provide an athletic player seating system which provides athletes with comfort, nourishment, and rejuvenation within a climate-enhanced setting during gameplay.

An athletic player seating system is disclosed herein. The athletic player seating system includes a seating unit comprising a first-seat, a center console, and a second-seat hosted on a frame. The first-seat and the second-seat are positioned on opposing sides of the center console. The first-seat and the second-seat each include a backrest, a seat portion, and a footrest. padded sections hosting heating elements and massagers are positioned on all user-contacting surface points of the backrest, the seat portion, and the footrest of the first-seat and the second-seat. The first-seat and the second-seat (more may be included) each further include a cooling system and a series of air vents positioned to direct air moved by the cooling system towards the first-seat and the second-seat. Additionally, the first-seat and the second-seat each include a first-bracket hosting a first-liquid-container and a second-bracket hosting a second-liquid-container.

The first-liquid-container hosted within the first-bracket is in communication with a first-tube and is configured to deliver a first-liquid contained within the first-liquid-container to a first-nozzle. The second-liquid-container hosted within the second-bracket is in communication with a second-tube being and is configured to deliver a second-liquid contained within the second-liquid-container to a second-nozzle. The center console further includes a control panel allowing users to control various functions of the seating unit. The center console also includes at least one oxygen tank connected to tubing which is configured to deliver air to at least one oxygen mask. The seating unit provides an enhanced seating arrangement for athletes.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an athletic player seating system, constructed and operative according to the teachings of the present disclosure.

The various embodiments of the present invention will hereinafter be described in conjunction with the appended drawings, wherein like designations denote like elements.

DETAILED DESCRIPTION

Figure 1:
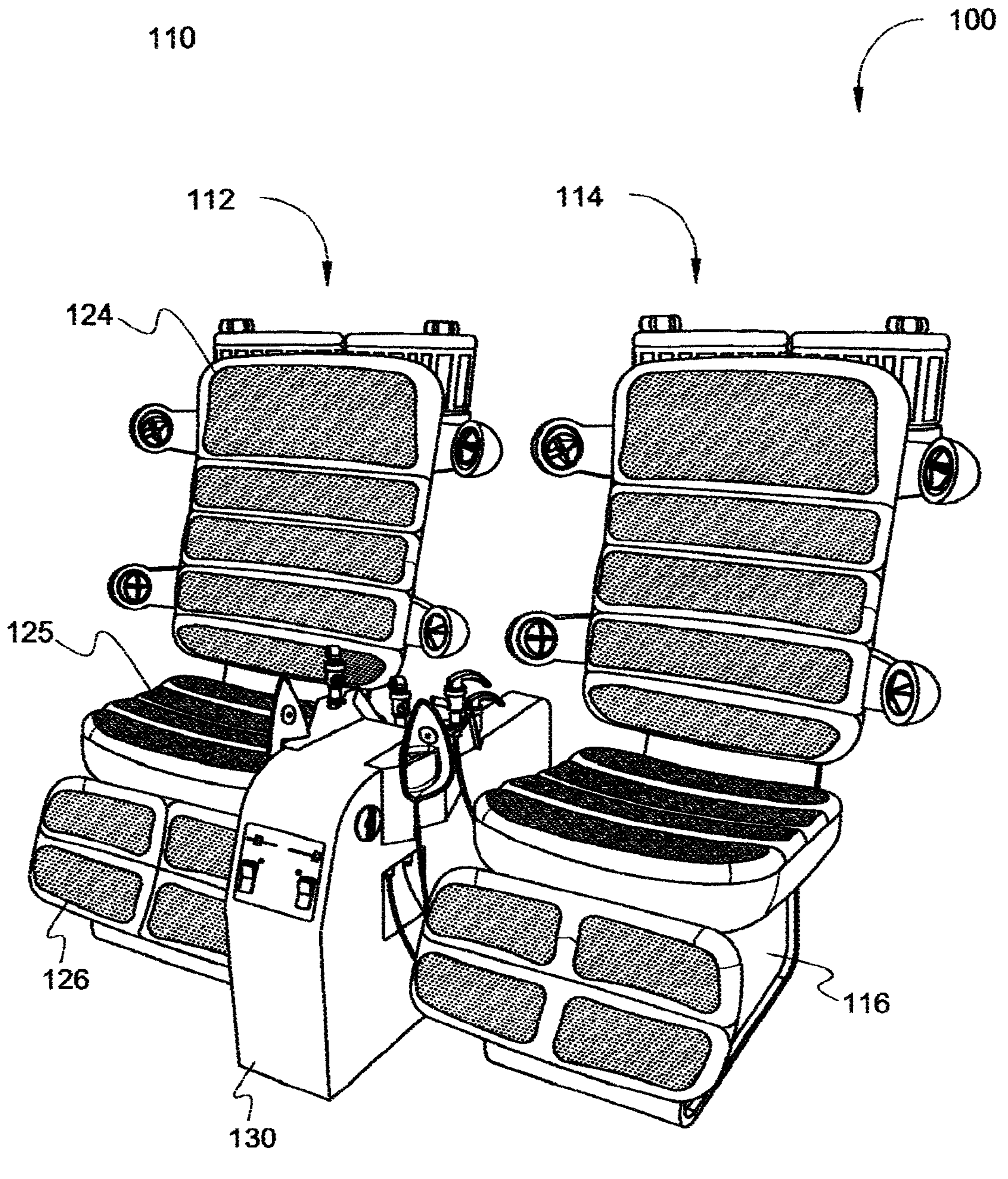
FIG. 1 is a perspective view of the athletic player seating system of FIG. 1, according to an embodiment of the present disclosure.

As discussed above, embodiments of the present disclosure relate to athletic seating and more particularly to an athletic player seating system as used to improve seating for athletes during competitions.

Generally, athletic player seating system is an ergonomically-designed, cushioned seating unit having a first-seat and a second-seat which provide heating, cooling, and massaging vibration within each individual seat of the seating unit. The first-seat and the second-seat each include a backrest, seat-portion, and footrest having padded sections on all user-contacting surface points. Massaging implements are preferably featured within the padded sections. Also featured within the padding area are heating elements for each individual seat space. In strategic locations of each seating area are vents that project cooled air from a cooling system contained under each seat.

Additionally, each padded section includes a covering having air-flow perforations to allow cold or hot area to flow through it based on individual settings of the athletic player seating system. Behind the backrest of each individual seat are insulated containers for separate storage of water and sports-drink beverages. Hoses with dispensing nozzles extend from these insulated containers to each seat. The seating unit comprises a center console positioned between the first-seat and second-seat. The center console hosts oxygen tanks, rechargeable battery or other suitable power source, and other components. Multiple user interfaces allow each individual player to control the functional elements of a specific seating area. By eliminating a need for athletes to walk to a serving area, and by allowing them to access beverages from the seating unit, the athletic player seating system allows athletes to remain focused on a game. The athletic player seating system provides the oxygen restoration needed by athletes who frequently require oxygen at rates greater than their bodies can produce, and which would ordinarily result in muscle fatigue due to oxygen deprivation.

The athletic player seating system can be made in variations that include a panel extending over the seating area, and to protect athletes from elements such as rain and snow, and also to protect athletes from objects that may be spilled or thrown by attendees of its sporting event of use.

The athletic player seating system can be made in different sizes and shapes with accommodations for a various number of seated occupants. All components of the athletic player seating system can be made of various materials capable of maintaining its intended goals. The athletic player seating system can be made in variations of size and design to accommodate use in various sporting environments, such as for a standard baseball dugout. The athletic player seating system can also be made in variations that are fully enclosed, and that feature glass material panels as entire walls or as window sections. In these variations, the glass material may be bullet-resistant for additional security of the occupants of the enclosed area. Additionally, the enclosed area may include its own heating and cooling systems. This variation can provide protection from exposure to COVID-19.

A method of using the athletic player seating system is as follows: a seating unit of the athletic player seating system may be positioned at a sideline of an athletic field or court. The first-liquid-container and second-liquid-containers may be filled with water and sports beverage respectively. Athletes may sit in the first-seat or second-seat during a competition for rest. If desired, heating or cooling air can be provided to an athlete, and the athlete may also receive massaging stimulation while seated. If needed, oxygen may be accessed directly from tubing extending to the seating unit. Water or sports beverage may also be accessed by each individual occupant, as well. With use of the athletic player seating system athletes can be quickly restored to continue physical exertion at an optimum level.

Referring now more specifically to the drawings by numerals of reference, there is shown in FIGS. 1-9, various views of an athletic player seating system 100.

FIG. 1 shows an athletic player seating system 100 according to an embodiment of the present disclosure. As illustrated, the athletic player seating system 100 may include a seating unit 110 comprising a first-seat 112, a center console 130, and a second-seat 114 hosted on a frame 116. The first-seat 112 and the second-seat 114 are positioned on opposing sides of the center console 130. The first-seat 112 and the second-seat 114 each include a backrest 124, a seat portion 125, and a footrest 126. Padded sections 118 hosting heating elements 120 and massagers 122 are positioned on all user-contacting surface points of the backrest 124, the seat portion 125, and the footrest 126 of the first-seat 112 and the second-seat 114. The first-seat 112 and the second-seat 114 each further include a cooling system 140, and a series of air vents 144 positioned to direct air moved by the cooling system 140 towards the first-seat 112 and the second-seat 114. Additionally, the first-seat 112 and the second-seat 114 each include a first-bracket 156 hosting a first-liquid-container 158 and a second-bracket 166 hosting a second-liquid-container 168.

Figure 2:
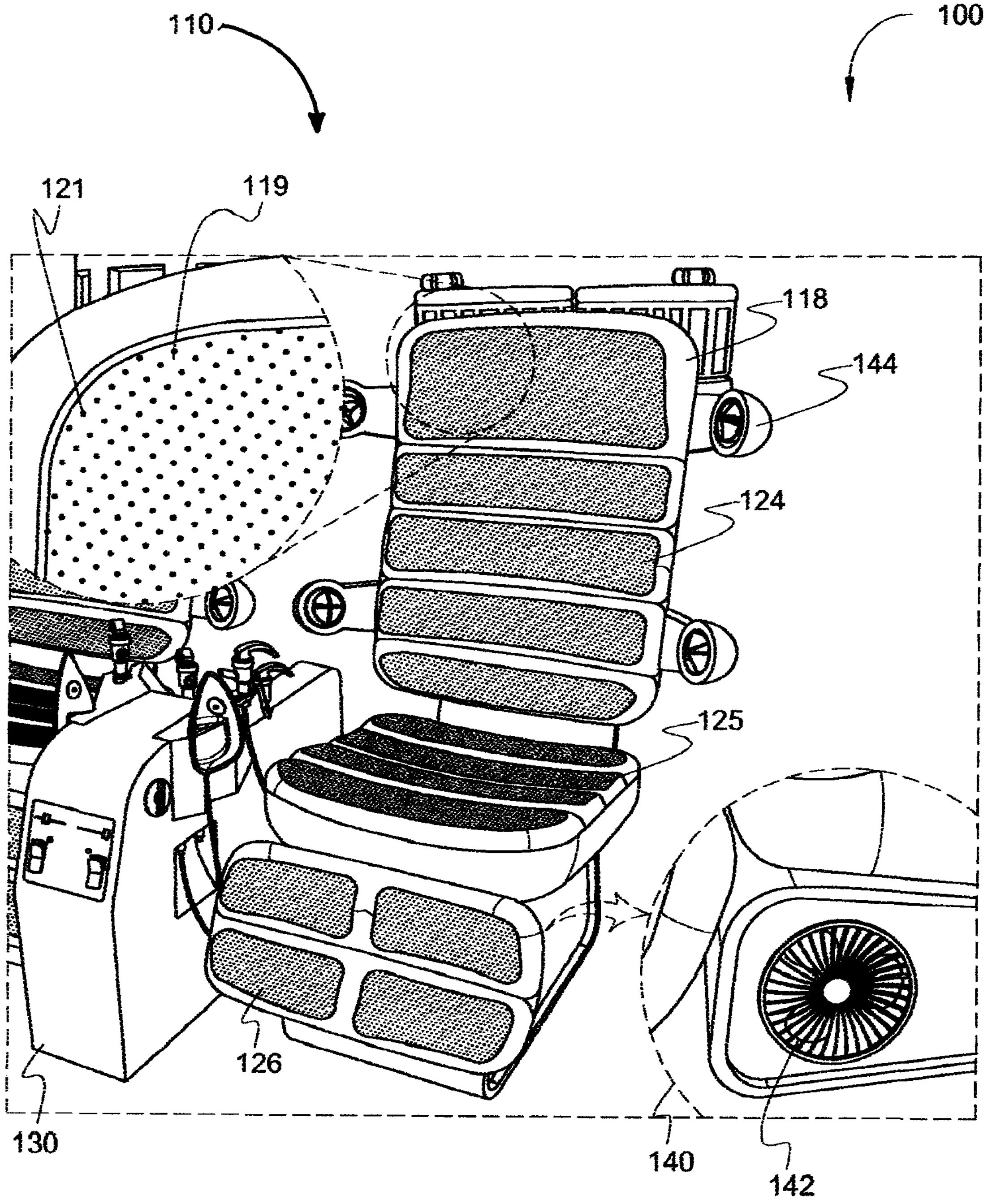
FIG. 2 is a perspective view of a cooling system of the athletic player seating system of FIG. 1, according to an embodiment of the present disclosure.

FIG. 2 shows the athletic player seating system 100 of FIG. 1, according to an embodiment of the present disclosure. As above, the athletic player seating system 100 includes a cooling system 140 provided for maintaining a desired personal climate temperature for a user sitting in one of the first-seat 112 and the second-seat 114. The cooling system 140 includes at least one fan 142 positioned below the seat portion 125 of both the first-seat 112 and the second-seat 114. As shown, the series of air vents 144 are positioned along side portions of the backrest 124 and allow air flow from the cooling system 140 to the user seated in the seating unit 110. The padded sections 118 are encased in a covering 119 having air-flow perforations 121 allowing for hot air and cold air to flow therethrough. The covering 119 may include a perforated synthetic leather material comprised of a polyurethane. Other materials may be used.

Figure 3:
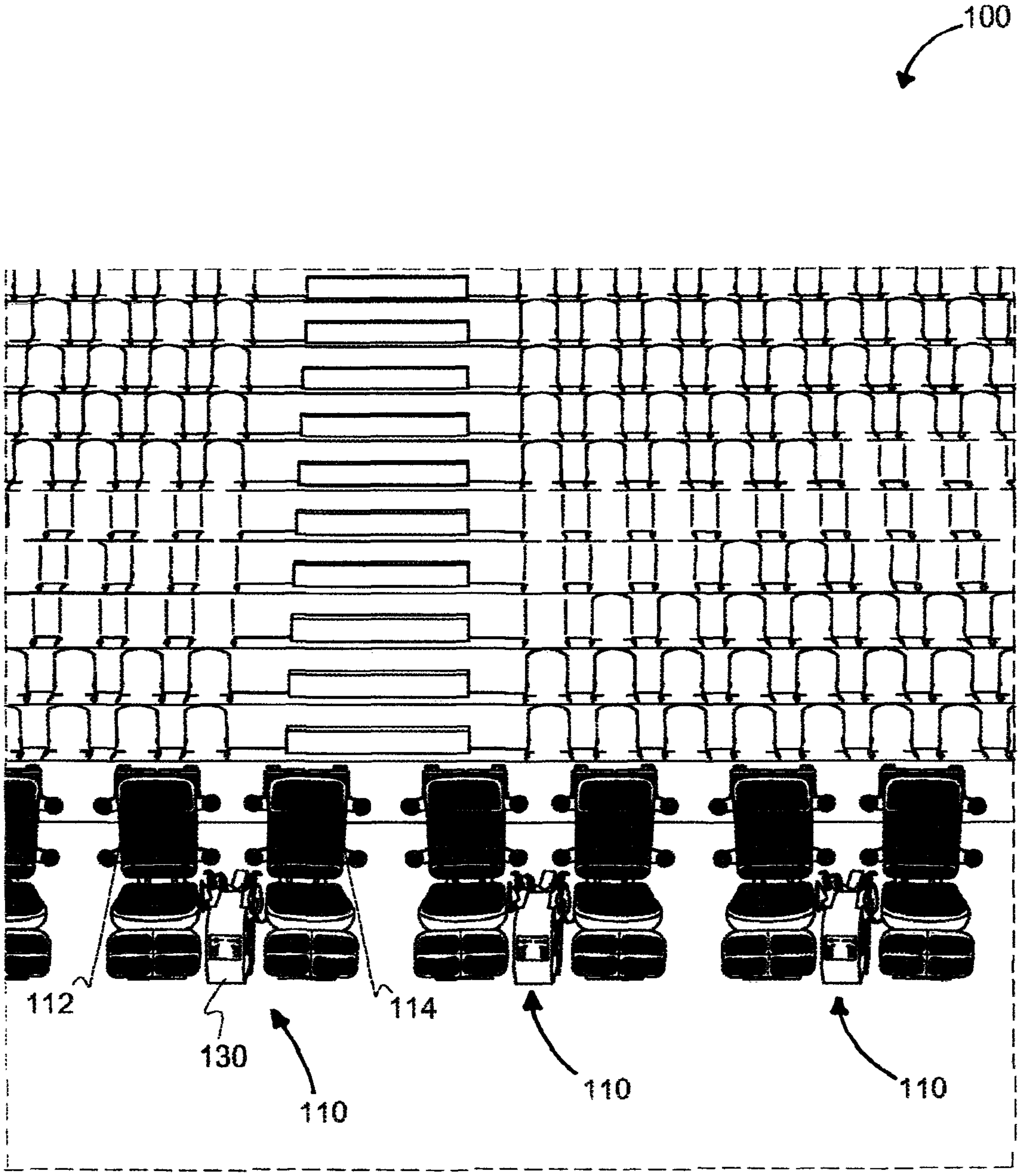
FIG. 3 is a perspective view of the athletic player seating system during a ready-for-use' condition, according to an embodiment of the disclosure.

FIG. 3 is a perspective view of the athletic player seating system 100 of FIG. 1 during a 'ready-for-use condition', according to an embodiment of the present disclosure. The athletic player seating system 100 provides enhanced seating for athletes during competitions. The first-seat 112 and the second-seat 114 each comprise a height of approximately twenty-inches, a depth of approximately twenty inches, and width of approximately twenty-six inches. A plurality of the seating units 110 may be used in combination with each other. The athletic player seating system 100 includes massagers 122 in all contact points of the back rest 124, seat portion 125, and footrest 126 to provide needed muscle comfort, blood and oxygen flow, and energy restoration to a user during physical exertion of athletic competitions. By providing massage, the athletic player seating system 100 provides athletes and other users relief from muscle pain acquired during competition, and rejuvenates those muscles for continued exertion.

Figure 4:
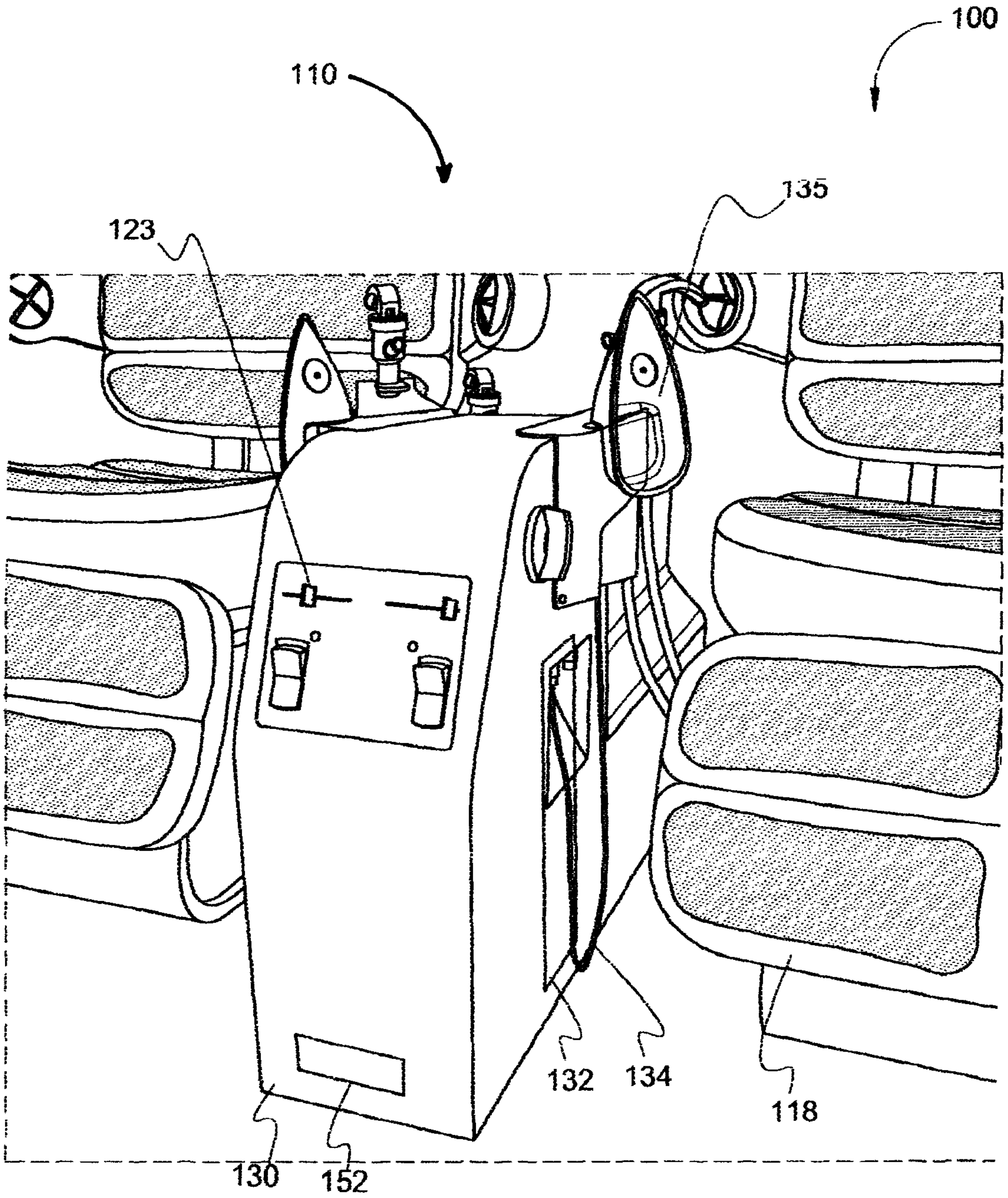
FIG. 4 is a perspective view of the center console of the athletic player seating system of FIG. 1, according to an embodiment of the present disclosure.

FIG. 4 is a perspective view of the center console 130 of the athletic player seating system of FIG. 1, according to an embodiment of the present disclosure. The center console 130 hosts at least one oxygen tank 132 connected to tubing 134 which is configured to deliver air to at least one oxygen mask 135. The center console 130 further houses a power source 152 and includes a control panel 176. The power source 152 may be a rechargeable battery or other suitable source of power.

Figure 5:
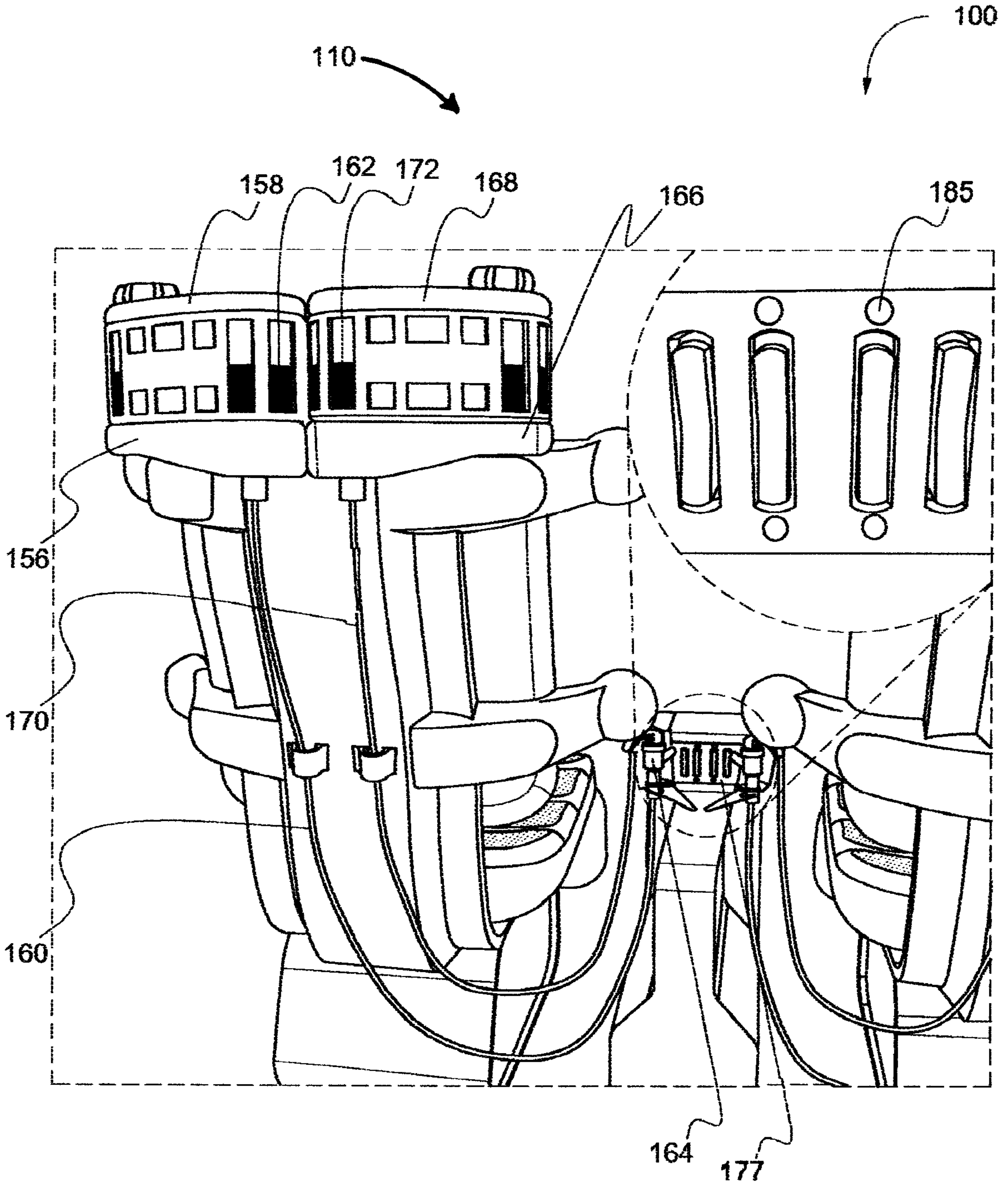
FIG. 5 is a rear perspective view of the athletic player seating system of FIG. 1, according to an embodiment of the present disclosure.

FIG. 5 is a rear perspective view of the athletic player seating system 100 of FIG. 1, according to an embodiment of the present disclosure. The first-liquid-container 158 hosted within the first-bracket 156 is in communication with a first-tube 160 and is configured to deliver a first-liquid 162 contained within the first-liquid-container 158 to a first-nozzle 164. The second-liquid-container 168 hosted within the second-bracket 166 is in communication with a second-tube 170 being and is configured to deliver a second-liquid 172 contained within the second-liquid-container 168 to a second-nozzle 174. The first-liquid-container 158 and the second-liquid-container 168 are insulated to maintain liquid temperatures. In a preferred embodiment, the first-liquid 162 contained within the first-liquid-container 158 is a sports beverage and the second-liquid 172 contained within the second-liquid-container 168 is water. Water and sports beverages may be conveniently accessed for immediate consumption, allowing users to rehydrate and restore nutritional content during athletic competition. As shown, the control panel 176 includes a climate control user interface 177 for controlling the cooling system 140 and the heating elements 120 to maintain a desired personal climate temperature for a user sitting in one of the first-seat 112 and the second-seat 114. The control panel 176 further includes indicator lights 185.

Figure 6:
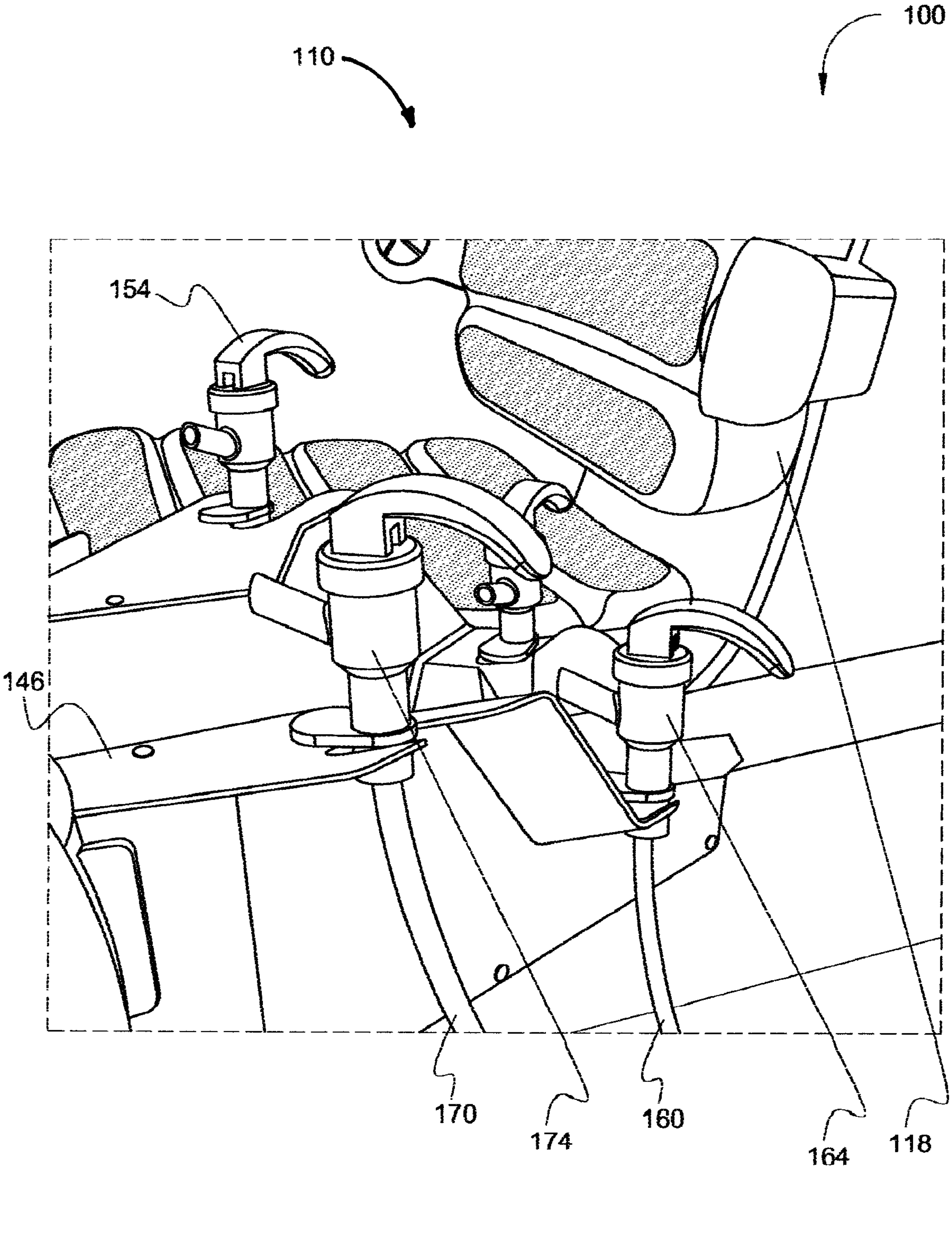
FIG. 6 is a perspective view of the athletic player seating system of FIG. 1, according to an embodiment of the present disclosure.

As shown in detail, in FIG. 6, the first-nozzle 164 and the second-nozzle 174 each comprise a dispensing nozzle 154. The center console 130 includes a series of nozzle-brackets 146 for receiving and supporting the first-nozzle 164 and the second-nozzle 174 of the first-seat 112 and the second-seat 114. The first-nozzle 164 and the second-nozzle 174 may be easily accessed by a user.

Figure 7:
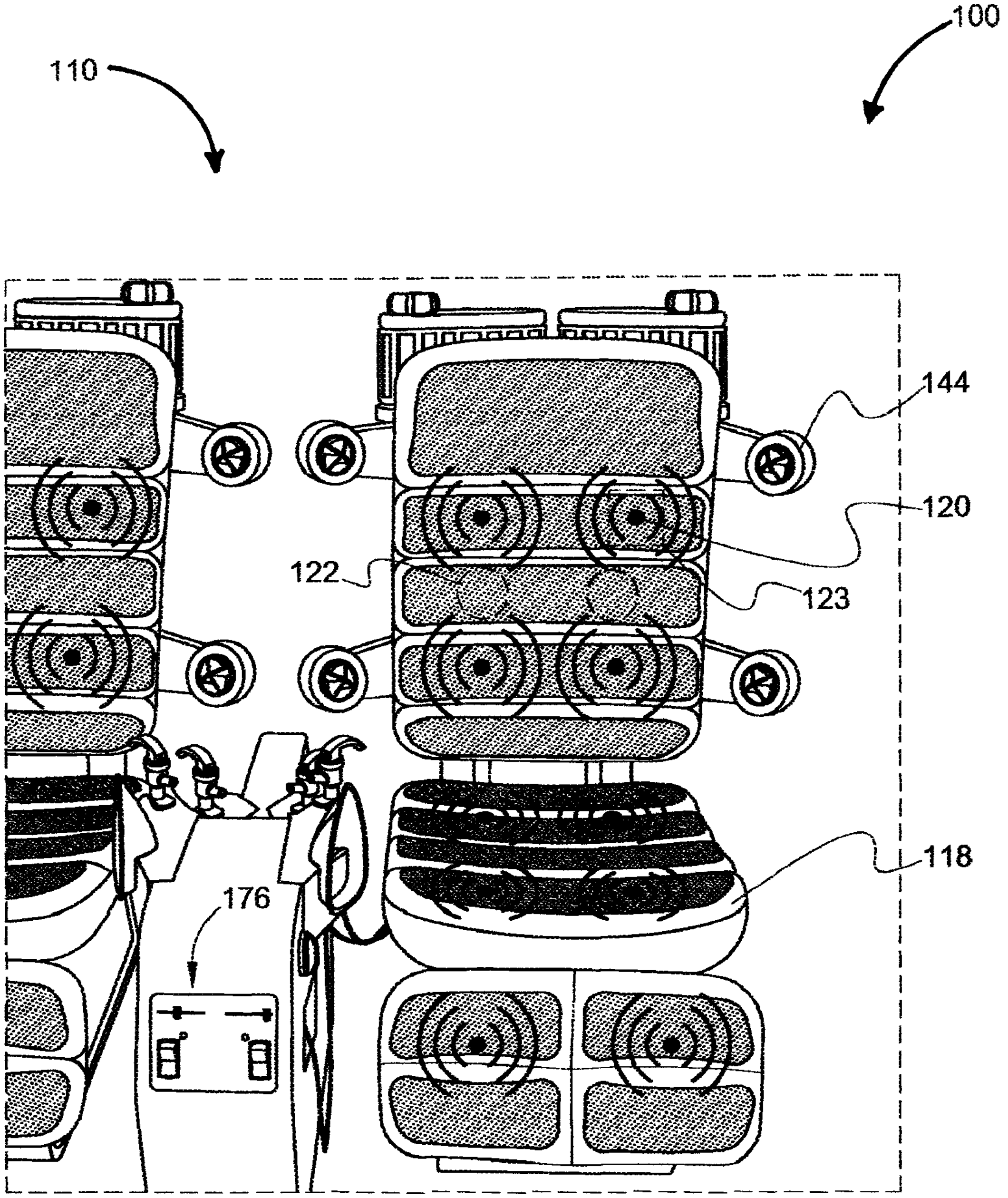
FIG. 7 is a front view of the athletic player seating system of FIG. 1, according to an embodiment of the present disclosure.
Figure 8:
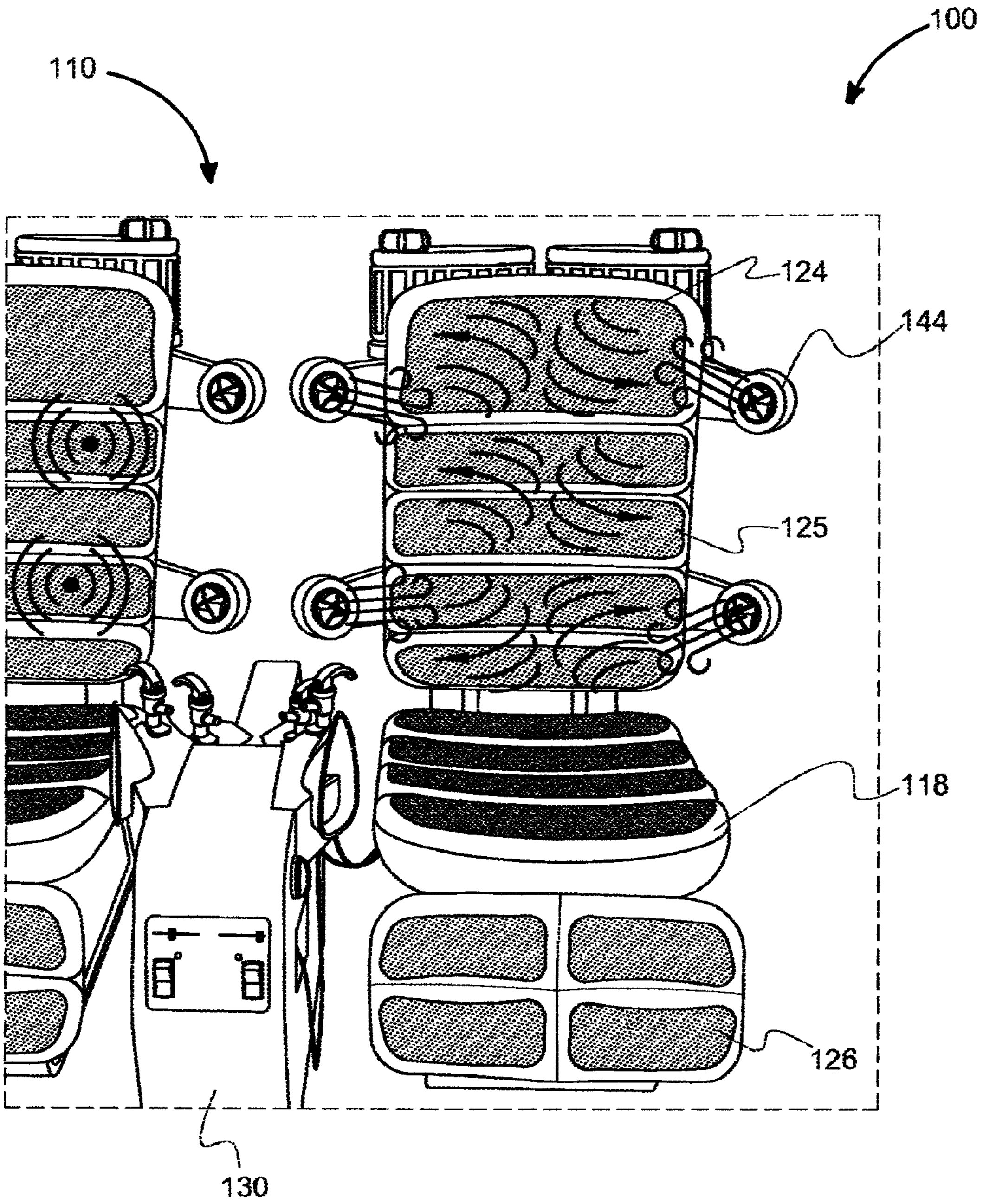
FIG. 8 is a front view of the athletic player seating system of FIG. 1, according to an embodiment of the present disclosure.

FIGS. 7-8 are front views of the athletic player seating system 100 of FIG. 1, according to an embodiment of the present disclosure. The center console 130 includes the control panel 176 allowing a user to adjust various settings and functions of the seating unit 110. The control panel 176 further includes a massage function control 123 for controlling a frequency and intensity of vibration of the massagers 122. FIG. 7, illustrates the circulation of heat through the seating unit 110. FIG. 8, illustrates the circulation of air through the seating unit 110.

Figure 9:
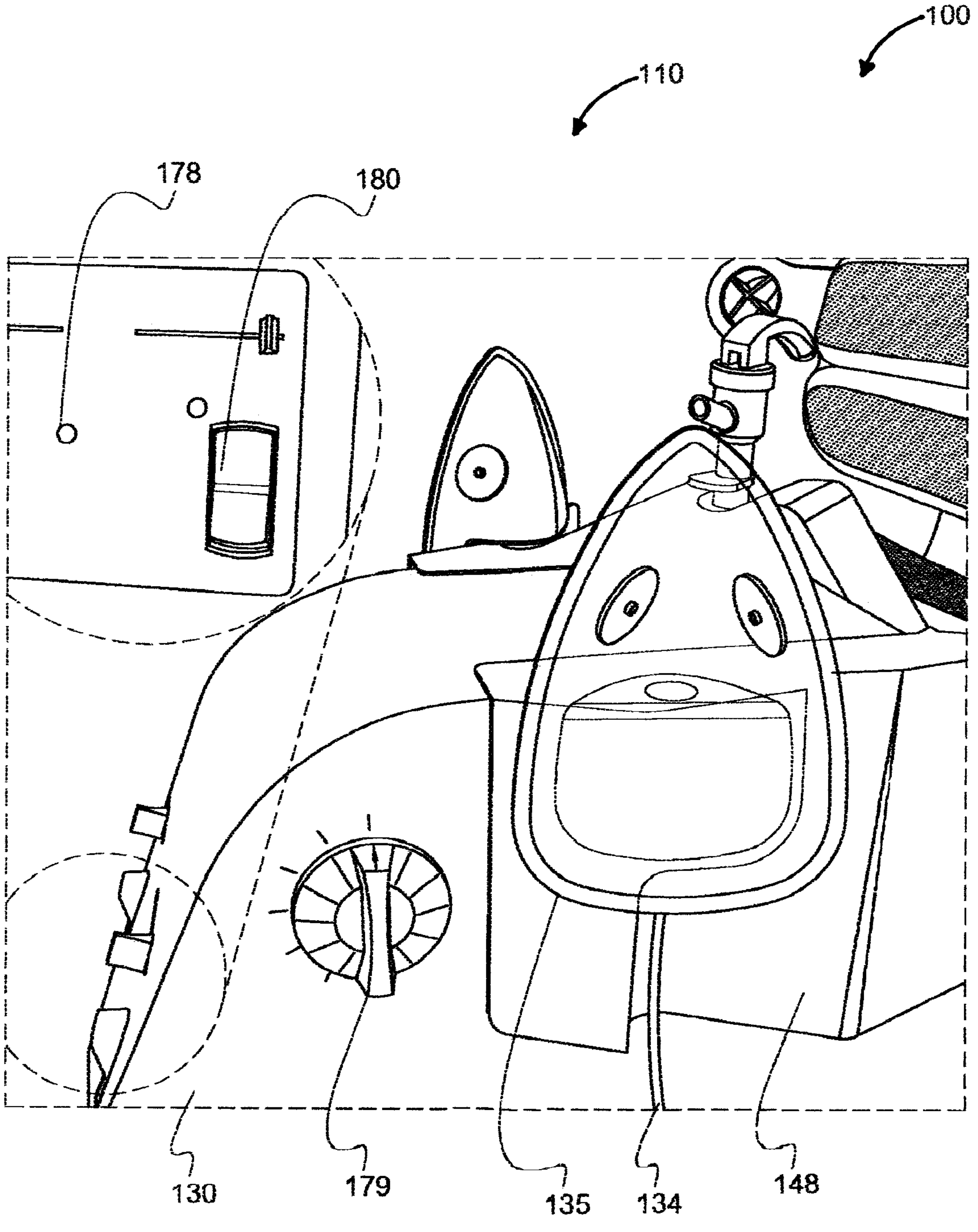
FIG. 9 is a perspective view of the center console of the athletic player seating system of FIG. 1, according to an embodiment of the present disclosure.

FIG. 9 is a perspective view of the center console 130 of the athletic player seating system of FIG. 1, according to an embodiment of the present disclosure. The control panel 176 is shown including an oxygen delivery user control 178 including an oxygen delivery control knob 179 for controlling air flow from the at least one oxygen tank 132 to the at least one oxygen mask 135 and at least one activation switch 180. The center console 130 further comprises oxygen mask brackets 148 for hosting the at least one oxygen mask 135 between uses. The at least one oxygen mask 135 (or other suitable means) is supported in a convenient accessible location.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An athletic player seating system, said athletic player seating system consisting of:

a seating unit including, a first-seat supported on a first seat frame and a second-seat supported on a second seat frame, the first and second seat frames being spaced apart from each other, each of the first and second seats having a backrest, a seat portion and a footrest, each of the backrests including a front side, a rear side, an upper end and a lower end, each of the backrests, seat portions and footrests having more than one padded section having heating elements and massagers, wherein each of said more than one padded section are encased in a covering, having air-flow perforations allowing for hot air and cold air to flow therethrough, and are positioned on all user-contacting surface points of said backrest, said seat portion, and said footrest of said first-seat and said second-seat, wherein said first-seat and said second-seat each comprise a height of approximately twenty-inches, a depth of approximately twenty inches, and width of approximately twenty-six inches;

wherein each of the backrests include a cooling system, each cooling system is formed by a fan and a series of air vents configured to direct air from the fan towards each front side of each backrest of the first-seat and second-seat, wherein each fan is positioned below each seat portion of the first-seat and second-seat and each air vent of the series of air vents is formed by a flat portion extending to a cone portion, wherein each air vent of the series of air vents is positioned exterior to each backrest, wherein each flat portion of the series of air vents extends from a center portion of each rear side of the backrest toward the cone portion at the front side of each backrest, where two upper air vents of the series are positioned at the upper end and rear side of each backrest and where two lower air vents of the series of air vents are positioned at the lower end and rear side of each backrest, wherein each of the backrests include a first-bracket positioned at the rear side and the upper end of each backrest, each first-bracket supporting, a first-liquid-container having a circumferential wall, which extends along the upper end of each backrest, and a bottom portion, the bottom portion of the first liquid container is in fluid communication with a first-tube being configured to deliver a first-liquid contained within said first-liquid-container to a first-nozzle, the first nozzle releasably supported by a first nozzle bracket, the first-tube connected to the center portion of the rear side of each backrest, wherein each of the backrests include a second-bracket positioned at the rear side and the upper end of each backrest and opposite to the first-bracket, each second-bracket supporting, a second-liquid-container having a circumferential wall, which extends along the upper end of each backrest, and a bottom portion, the bottom portion of the second liquid container is in fluid communication with a second-tube being configured to deliver a second-liquid contained within said second-liquid-container to a second-nozzle, the second nozzle releasably supported by a second nozzle bracket, the second-tube connected to the center portion of the rear side of each backrest, wherein said first-liquid-container and said second-liquid-container are insulated, wherein said first-liquid contained within said first-liquid-container is a sports beverage and said second-liquid contained within said second-liquid-container is water;

wherein said first-nozzle and said second-nozzle each comprise a dispensing nozzle;

a center console having a front side, a rear side, a first lateral side and a second lateral side, a control panel positioned along the front side of the center console and a power source including a rechargeable battery, wherein said first-seat and said second-seat are positioned on opposing sides of said center console; the central console including, wherein said control panel includes an oxygen delivery user control including at least one activation switch and an oxygen delivery control knob for controlling air flow from said first oxygen tank and said second oxygen tank to said first oxygen mask and said second oxygen mask, wherein said control panel further includes indicator lights; wherein said control panel further includes a massage function control, for controlling a frequency and intensity of vibration of said massagers, and said control panel includes a climate control user interface for controlling each cooling system and said heating elements to maintain a desired personal climate temperature for a user sitting in one of said first-seat and said second-seat;

the center console having the first nozzle bracket positioned along the first lateral side and the second nozzle bracket positioned along the second lateral side, the center console having a first oxygen mask bracket positioned adjacent to the first nozzle bracket and hosting a first oxygen mask and a second oxygen mask bracket positioned adjacent to the second nozzle bracket and hosting a second oxygen bracket the central console having a first oxygen tank positioned on the first lateral side and a second oxygen tank positioned on the second lateral side, tubing in communication with of the first oxygen tank and the second oxygen tank and being configured to deliver air to each of the first oxygen mask and the second oxygen mask.

* * * * *